July 16, 1963 F. V. WINDES ET AL 3,098,214

ANALOG SIGNAL SWITCHING APPARATUS

Filed Dec. 31, 1958 2 Sheets-Sheet 1

INVENTORS
FRANK V. WINDES
ARCHIE J. PAUL

BY Harry T. Berriman

AGENT

United States Patent Office 3,098,214

Patented July 16, 1963

3,098,214

ANALOG SIGNAL SWITCHING APPARATUS

Frank V. Windes, Poughkeepsie, and Archie J. Paul, Wappingers Falls, N.Y., assignors to International Business Machines Corporation, New York, N.Y., a corporation of New York Filed Dec. 31, 1958, Ser. No. 784,134
4 Claims. (Cl. 340—147)

This invention relates to switching apparatus and more particularly to such apparatus for effecting high speed electronic switching of analog voltage signal circuits and for routing the analog voltage signals of such circuits.

In systems wherein the magnitude of certain physical measurements such as speed, direction, etc., is translated into an analog voltage representation with the magnitude of the analog voltage representing the magnitude of the particular physical factor being measured, it is essential that in switching or routing the analog voltages to analysis and utilization apparatus, that the switching or routing apparatus does not appreciably effect or load the circuit generating the voltage indication, and also, that it transmit or route the analog voltages from the generating apparatus to utilization apparatus with as little effect on the magnitude of the voltage signal as possible. If the switching or routing apparatus modifies the magnitude of the analog voltage signals, it is obvious that the utilization apparatus will have an inherent error factor in correspondence to this magnitude modification.

As a further requirement wherein the switching apparatus or routing apparatus may operate to route varying analog voltage signals from a plurality of input signal sources to a single output on a time multiplex basis, for example, the rate at which the input sources are sampled in time should be relatively fast in relationship to the rate at which the signal inputs may vary in time, in order to get a more continuous picture of what is happening to the inputs. This type of operation requires that the switching or routing operation not only be effected at a fast or electronic speed, but also that there be no interference or effect on an unswitched circuit or circuits as a result of switching another circuit or circuits, or vice versa.

It may be a further requirement that such analog signal switching apparatus be capable not only of rapidly and accurately effecting the desired switching functions, but also, provide a so-called "sample-hold" type operation. In this type of operation it is required, for example, that if an analog signal is routed from a desired input to an output, the output will be accurately maintained or "held" for an appreciable time period after the input is removed. However, as a further qualification, it is necessary that upon a subsequent switching application of a new input signal to an output, the "held" output must rapidly shift to an accurate indication of the new input signal.

Heretofore it has required very elaborate and expensive switching apparatus to effect switching functions for analog signals in accordance with the above requirements. The present invention provides a simplified apparatus for effecting switching action of analog signals in accordance with the above described requirements. This is effected by a unique circuit configuration of D.C. amplifier apparatus and electronic gate units.

It is accordingly an object of the invention to provide improved, simplified apparatus for effecting high speed switching and handling of analog voltage signals.

It is another object of the invention to provide improved high speed means for electronically switching analog voltage signal circuits.

It is another object of the invention to provide high speed means for electronically switching a plurality of analog voltage signal circuits on a time multiplex basis.

It is another object of the invention to provide high speed means for electronically switching an analog voltage signal circuit to one or a combination of output circuits.

It is another object of the invention to provide high speed means for electronically switching analog voltage signal circuits without the particular switched circuit or circuits affecting the unswitched circuits and vice versa.

It is still a further object of the invention to provide high speed transmission means for analog voltage signals wherein the magnitude of the transmitted signals are not appreciably modified by their transmission.

It is another object of the invention to provide an improved electronic switching device for analog voltage signal circuits which is simple in construction, capable of operating at a fast switching rate, and does not affect the analog voltage signals routed therethrough.

It is a still further object to provide an improved, high speed electronic switching unit for routing an analog voltage signal indication from a desired input circuit to a desired output, and wherein the output "holds" at the analog voltage level for an appreciable time after a removal of the connection to the input.

Other objects of the invention will be pointed out in the following description and claims and illustrated in the accompanying drawings, which disclose, by way of example, the principle of the invention and the best mode, which has been contemplated, of applying that principle.

Figure 1:
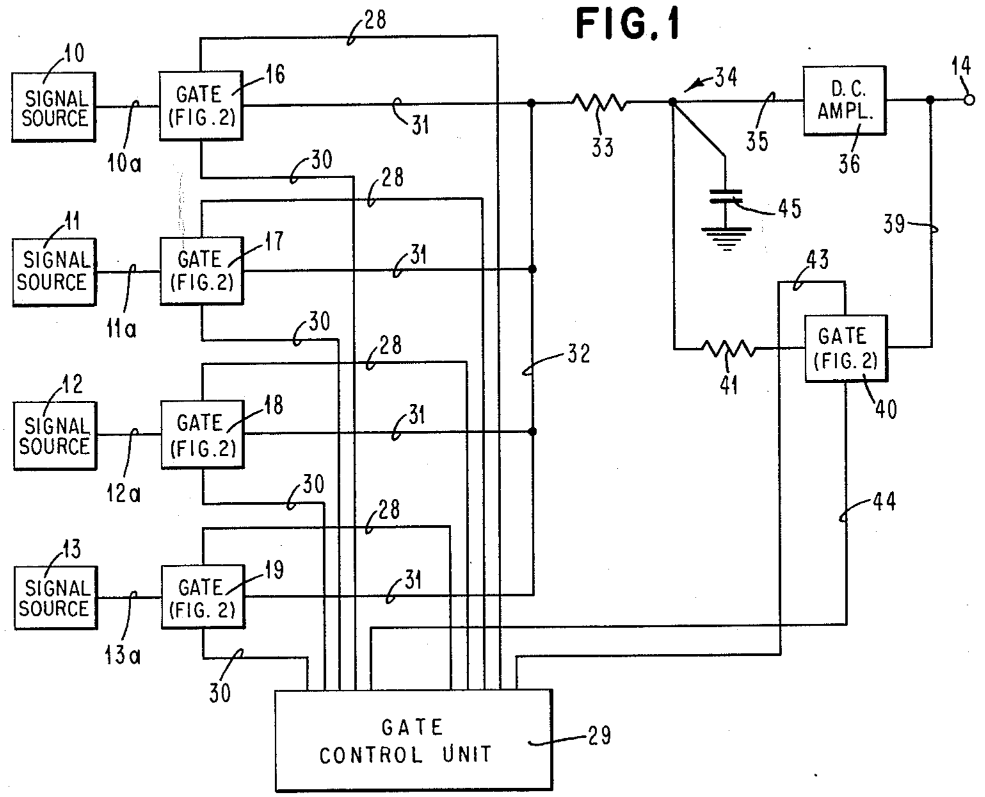
FIGURE 1 is a schematic circuit and block diagram of the preferred embodiment of the invention.
Figure 3:
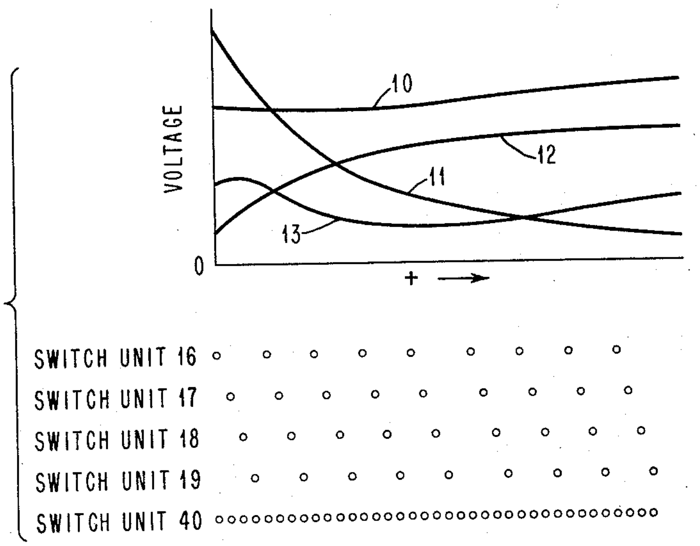
FIGURE 3 is a graph of representative input waveform signals and also shows a graph of the time intervals when the various switch units may be actuated during a typical operation of the circuit of FIGURE 1.

Referring now to FIGURE 1, there is indicated on the left of the drawing a number of signal sources designated by the reference character 10, 11, 12 and 13. Each of these signal sources 10 through 13 may generate a signal waveform which varies with time as indicated in FIGURE 3. It is desired to connect each of these signal sources at a separate and distinct time (time multiplexed) to an output terminal designated 14 on the right-hand side of FIGURE 1. It is also required that the signal output generated on terminal 14 be an accurate replica of the particular input signal as provided by the selected input signal source. It is also required that this time multiplex switching of the various inputs to the single output be done at electronic speeds.

Figure 2:
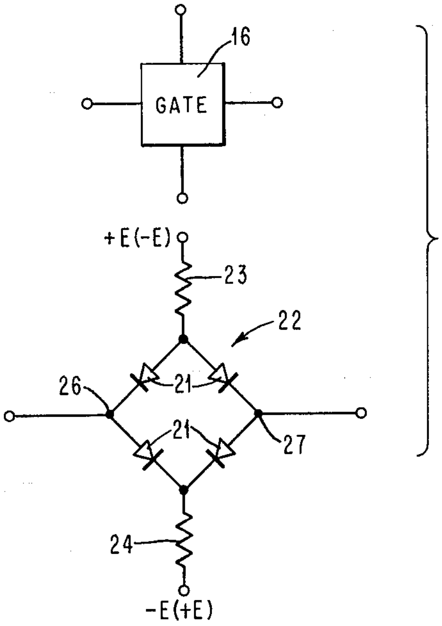
FIGURE 2 is a detailed circuit diagram and corresponding block symbol of the signal gates or switch units shown in FIGURE 1.

It will be noted that each of the input signal sources 10 through 13 is connected through a related conductor 10*a*, 11*a*, 12*a*, or 13*a* respectively to an associated gate circuit unit designated 16, 17 and 18 and 19, respectively. Referring now to FIGURE 2, it will be noted that each of the gate units 16 through 19 comprises four diodes 21 which are arranged in a bridge circuit generally indicated 22. The junction of the upper two diode legs of the bridge are connected through a resistor 23 to a suitable terminal for connection to an external circuit as will be later evident. Similarly the junction of the lower two diodes of the bridge 22 are connected through a resistor 24 to a suitable terminal for connection to an external circuit as will be later evident. The resistance of the two resistors 23 and 24 is very large compared to the forward resistance of the diodes 21 of the bridge circuit. A junction 26 of the two lefthand diodes and a junction 27 of the two righthand diodes are each also connected to suitable terminals as indicated for connection to the external circuitry.

If the upper terminal in FIGURE 2 of the gate unit is connected to suitable voltage source +E and similarly the terminal end of the resistor 24 is connected to a suitable voltage −E, the diodes 21 will all be rendered conductive and in effect a divider network exists with lefthand junction and righthand junction being at some voltage potential between + and −E. If the diodes 21 are selected so that the forward resistances thereof are substantially identical and if the resistances 23 and 24 are identical, and further, if the absolute magnitude of +E and −E is identical, it will be evident that the left hand junction and righthand junction will be at ground or 0 potential.

If now an input voltage is applied to the terminal connected to the lefthand junction 26 of the network, this input voltage will also appear at the terminal connected to the righthand junction 27. There will be a small amount of degeneration in this signal when it appears at the righthand terminal, this degeneration being due to the forward resistance of diodes 21. Since a diode is a nonlinear device, the amount of degeneration in the signal between the left and righthand terminals is dependent on the magnitude of the signal at the left hand terminal and is a repeatable amount of degeneration for any given input signal level. Because the back resistance of the diodes 21 is extremely large compared to the resistance of 23 and 24, it will be appreciated that if the potential +E is applied to the lower terminal and the potential −E is applied to the upper terminal, the gate unit is rendered inoperative and any input signal applied to the lefthand terminal will not appear at the righthand terminal. The righthand terminal will then be "floating" and will not effect any circuit to which it is connected. It is thus evident that dependent on the direction in which the potential +E and −E are applied to the upper and lower terminals of the unit of FIGURE 2, the gate unit functions as either a closed (inoperative) or open (operative) electronic gating unit. The gate unit is a high impedance device and when open (operative) transmits the applied signal therethrough without appreciably loading the signal source. The control potential +E and −E for the gate unit is larger than the largest signal to be switched by the unit, so that erroneous switching does not result.

Referring again to FIGURE 1, it will be recalled that each of the input signal sources 10 through 13 is connected through the associated conductor 10*a* through 13*a*, respectively, to the input signal terminals of the related gate units 16 through 19 respectively. The upper terminal (see FIGURE 2) of each of the gate units 16 through 19 is connected through a related individual conductor 28 to a gate control unit 29 at the lower part of the figure. Similarly, the lower terminal 24 of each of the units 16 through 19 is connected through a related individual conductor 30 to the gate control unit 29 on the bottom of the figure. The control unit 29 is adapted, in a manner that is well known to those acquainted in the art, to apply the proper potentials +E and −E to the upper and lower terminals of the particular gate unit 16 through 19 which it is desired to open at any one particular time and at the same time apply the potential +E and −E to the other switch units in the converse manner to render them inoperative (closed) at that time.

For example, referring to FIGURE 3 each of the dot representations in the chart for a particular gate unit represents the time interval when that gate is operated (open). Thus it will be noted that the switch control unit 29 is operative to open gate 16 in a first period of time to pass therethrough the signal applied from the related source 10. Similarly, at time intervals succeeding thereto the gate units 17, 18 and 19 are each opened, in turn, at a separate and distinct time interval to pass therethrough the related signal applied from the corresponding source 11, 12 and 13, respectively. The sequence of opening each of the input gates, in turn, is repeated over and over, as indicated. It will be noted that only one of the input gates is opened at any one time. Thus the various input signals are routed on a time multiplex basis to the output terminal 14.

Referring again to FIGURE 1, the righthand output terminal of each of the input gates 16, 17, 18 and 19 is connected through a conductor 31 to a common conductor 32, the latter conductor 32 being connected in turn through resistance 32 to a circuit junction point indicated as 34 in FIGURE 1. The junction 34 is connected through a conductor 35 in the inputs of a D.C. amplifier 36. The D.C. amplifier 36 is a high gain wide band D.C. amplifier designed to accept a small D.C. voltage and amplify this signal, in a way well known to those acquainted with the art, to provide a voltage output which can be used to drive other circuits. D.C. amplifier action is well known and will not be described herein. The D.C. amplifier 36 shown may, for example, be any one of many well known types such as the Model 111 AF–D.C. amplifier obtainable from the Kintel Division of Cohu Electronics, 5725 Kearny Villa, San Diego 12, California. The output of the D.C. amplifier 36 is connected to the previously mentioned output terminal 14 which feeds signal utilization circuitry (not shown) as desired.

The output of the amplifier 36 is also connected through a conductor 39 to the input terminal of gate unit 40. The latter gate unit is identical to the previously described gate units 16, 17, 18 and 19. The output terminal of the gate unit 40 is connected through a resistance 41 to the previously mentioned junction 34. The conductor 39, the gate unit 40 and the resistance 41 accordingly from a feedback signal loop from the output of the D.C. amplifier 36 back to the input of the amplifier as will be evident. The punction 34 including resistor 41 in the feedback circuit from the amplifier output circuit to the amplifier input circuit, and the resistor 32 in the input circuit to the amplifier, accordingly form an adding network for the input and feedback signals. A capacitor 45 is connected between the junction 34 and ground as shown.

The gate unit 40 has its upper terminal (see FIGURE 2) and lower terminal connected by conductors 43 and 44 respectively to the gate control 29 previously mentioned. The gate control unit 29, in the same manner previously described in relationship to gate units 16 through 19, is adapted to apply the proper potentials + and −E through conductors 43 and 44 to render gate unit 40 operative (open) to pass a signal therethrough when desired.

The gate control unit 29 is so arranged that when any specific one of the gate units 16 through 19 is open to permit a signal to pass from the related signal source, the gate unit 40 is also opened to pass any signal therethrough from the amplifier output, through the conductor 39 and back to the input of the amplifier 36 (see FIGURE 3). Assuming a signal applied to the input of the D.C. amplifier 36, this signal will be amplified and will result in an inverted or 180 degree phase shift signal resulting on the output of the amplifier. By reason of the feedback path through conductor 39 this signal is fed back through the gate unit 40, when closed, and resistance 41 to the junction 34, and then to the input of the amplifier 36. This feedback signal on the amplifier input is in a direction to decrease the original input signal present thereon and drives the junction 34 towards zero potential. The junction will, of course, not be actually driven to zero potential but will be driven to a null point wherein the open loop gain of the amplifier maintains the output equal to the input.

Each particular input gate 16 through 19, when closed introduces an equivalent resistance in the signal path from the related signal source, through that switch, to the junction 34, and finally to the input of the amplifier 36, this equivalent resistance being a non-linear function of the input signal level as previously explained. This equivalent resistance of the input switch attenuates the input signal to some extent. At the same time, the simultaneously closed gate unit 40 in the feedback loop around the amplifier 36 also introduces an equivalent resistance in this feed back signal loop, this resistance being a function of the feedback signal level.

The total effective resistance in the input signal loop to the junction 34 and in the feedback signal loop to the junction 34, together determine the actual gain of the overall circuit. This results because, as previously mentioned, any signal at the junction 34 gives an inverted signal or a signal of 180° phase shift at the D.C. amplifier 36 output, which in turn through the feedback loop tends to drive the input signal at the summing junction to "zero." A magnitude or percentage magnitude of the input signal must be delivered to the output 14 in order to drive the summing junction 34 to a null or "zero" equivalent point. If the resistance of the input circuit path is equal to the resistance of the feedback circuit path then the gain of the amplifier will be "1" and there will be produced at the output terminal 14 a voltage which is equal in magnitude to the input voltage supplied to the particular open (operative) gate input 16 to 19. Thus $$(1)\qquad \frac{E\ \text{output}}{E\ \text{input}}=\frac{R\ \text{output circuit}}{R\ \text{input circuit}}$$

transposing gives $$(2)\qquad E\ \text{output}=E\ \text{input}\times\frac{R\ \text{input circuit}}{R\ \text{feedback circuit}}$$

where $R$ input circuit—$R$ input gate+input resistor 13 and $R$ feedback circuit=$R$ feedback gate+feedback resistor 41

By selecting diodes 21 with closely controlled forward resistances for all of the input gates 16 through 19 and the feedback gate 40, the non-linear resistance of all the switches for the range of signals desired to be handled can be made to be very close. Also, the input resistance 33 and feedback resistance 41 are selected equal in magnitude and as a further means of minimizing any slight unbalance in the resistances of the input and feedback switches, the resistances 33 and 41 are chosen to be very large in relationship to their associated switch resistances. As a result, the numerator and denominator of the fraction relating to resistances in Equation 2 above became equal and this factor becomes 1. As a result $$E\ \text{ouput}=-E\ \textit{input}$$

The circuit configuration of FIGURE 1 accordingly provides a precision, high speed switching apparatus for selectively generating on an output terminal 14 an accurate replica of a signal from any desired one of a plurality of input signal sources and wherein the output signal is accurate within at least .1% of the magnitude of the input signal. The so-called "sample rate" or the time that any particular one of the input gates is open is short in relationship to the rate of change of the signal level from any one of the signal sources.

When one of the input gates 10 through 13 is open and the gate unit 40 also opened so that the output terminal 14 is at the same potential as the signal supplied by the related input signal source, the capacitor 45 at the summing junction 34 charges to a voltage which is the normal operating voltage to maintain the proper output signal level, the voltage being almost zero or at a null as previously mentioned. Subsequently, with the simultaneous closing of the particular input gate and the feedback gate 40, the capacitor 45, due to the very high back resistance of the closed input gates and closed feedback switch, will maintain the summing junction voltage almost exactly. The output from the D.C. amplifier 11 and associated terminal 14 will accordingly be maintained substantially constant for an appreciable time until the capacitor 45 has discharged through the multimegohm back resistances of the closed (inoperative) input and feedback gates and through the grid to cathode or grid to ground resistance of the input circuit of the D.C. amplifier 36. Of course with the re-establishment of a voltage input by the opening of another one of the input gates and the simultaneous closing of the feedback gate 40, the output terminal 14 assumes the proper potential equal to the input voltage at that time. The circuit configuration may be operated as a "sample and hold" circuit in that it samples each selected input voltage source in turn, to produce a duplicate voltage indication on the output terminal 14, and, after the "sample," will hold the terminal 14 at the same voltage until the next input signal source is "sampled" to repeat the operation.

If the "holding" function is not desired, the capacitor 45 may be removed from the circuit. Under these circumstances, the switching apparatus still function to very accurately reproduce on the output 14, a signal applied from any selected one of the sources 10 through 13 by the opening of the related input gate and the simultaneous opening of the feedback gate 40. However, with a closing of these two open gates and assuming the other input gates also closed, the output 14 is not held, but goes to zero. Under some circuit requirement this type of operation of just "sample" is desired instead of the "sample-hold" operation.

It is thus evident from the above description that the invention provides a simplified circuit for switching an analog input signal source to an output, the switching being effected at electronic speeds, with the transmitted signals on the output being a very accurate replica of the related input signals.

It will be appreciated in FIGURE 1 that the showing of four input signal sources for connection on a time multiplex basis to a single output is again only representative and more or less inputs could be handled by duplicating or removing the appropriate switching circuit as required. Of course in such expanded (or contracted) versions of the circuits of FIGURE 1, the related gate control unit 29 would obviously have to be altered accordingly to control the expanded (or contracted) switching circuitry.

Representative values for circuit parameters of FIGURE 1 and FIGURE 2 are as follows:

| | |
|---|---|
| Diodes 21 | 1N464 or 6AL5 diodes. |
| +E and —E | +100 v. and —100 v. |
| Resistors 23, 24 | 20,000 ohms. |
| Resistors 33, 41 | 1 megohm. |
| Capacitor 45 | 0 to 50 $\mu\mu$fd. depending on frequency of operation. |

Figure 4:
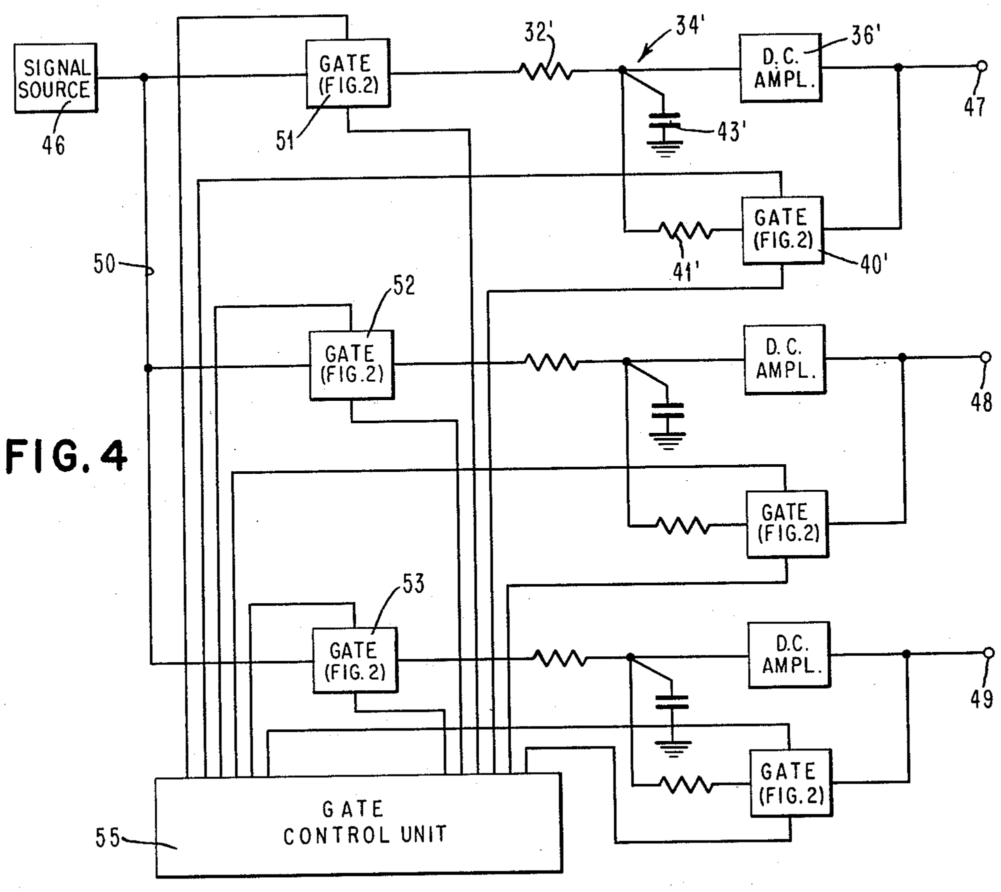
FIGURE 4 is a schematic circuit diagram of an alternate application of the invention wherein a single input signal line may be switched to one or a combination of output lines as required.

Referring now to FIGURE 4 there is shown an alternate application of the electronic switching circuit which permits a single input signal source such as 46 to be connected, as required, to any selected one or combination of possible output terminals such as terminals 47, 48 and 49. It will be noted that the signal source 46 is connected to a common conductor 50 which feeds a number of gate units 51, 52 and 53. Each of the input gates feeds a circuit configuration comprised of an input resistor 32′ summing junction 34′, D.C. amplifier 36′ including feedback resistor 41′ and feedback switch 40′ which is substantially identical to that portion of the circuit configuration to the right of conductor 32 in FIGURE 1 and these circuit elements are accordingly labeled with the same reference characters plus an additional prime designation thereon. Thus the amplifier in FIGURE 4 corresponds to the amplifier 36 in FIGURE 1 etc.

Each of the input gate units 51, 52 and 53 and their related associated gates 40′ in the related feedback circuit, are identical in construction and operation to the switch units 11 through 16 and 40 as described above in relationship to FIGURES 1 and 2 of specification. As before, all of the gate units 51, 52, 53 and their associated feedback gate units 40' have very close electrical resistance characteristics resulting from a matching of the diode 21 (see FIG. 2) comprising the switch units. To generate on the upper output terminal 47 in FIGURE 4, a voltage corresponding to the voltage then generated by source 46, a gate control unit 55 similar in function to previously mentioned unit 29 (FIG. 1), applies the potentials +E and −E in the proper manner to open both input switch 51 and the associated switch 40' in its associated D.C. amplifier feedback circuit. With both switches opened, the related circuit configuration comprised of junction 34', amplifier 36', etc. functions in a manner previously described in relationship to the operation of the circuit of FIGURE 1, to accordingly generate on the associated output terminals 47 an accurate indication of the input signal.

Each of the circuit configurations associated with the other input switches 52 and 53 may be rendered operative, as desired, under the control of gate control unit 55, by opening the associated input switches 52 or 53 and simultaneously opening the feedback switch 40' in the corresponding D.C. amplifier circuit feedback path. Any one, or combination of the input switches 51, 52, 53 and the associated feedback switch or switches 40' may be closed at one time, as desired, to accordingly generate on the related output terminal 47, 48 or 49 an accurate indication of the signal being generated by the source 46 at that time. With the simultaneous closing of an input switch 51, 52 or 53 as the case may be, and the associated feedback switch (or switches) 40', the related output terminal will "hold" for an appreciable period of time at the same output potential as when the sample of the input was effected, this "hold" action being identical to that previously described in relationship to FIGURE 1. If desired, the capacitor 45' may be removed to eliminate the "hold" action as previously mentioned in relationship to FIGURE 1.

It will be appreciated in the circuit shown in FIGURE 4, that the showing of only three output terminals 47, 48 and 49 to which the input signal source may be connected, as desired, is only representative and more outputs could be provided in an obvious manner by providing duplicate circuitry for each additionally desired output terminal, and also altering the gate control 55 as required. The circuit configuration in FIGURE 4 accordingly permits a single input signal source to be switched to any desired one or a combination of a plurality of possible signal output terminals, the switching again being done at electronic speeds with the switching gear not appreciably altering the signals transmitted therethrough.

While there have been shown and described the fundamental novel features of the invention as applied to a preferred embodiment, it will be understood that various omissions and substitutions and changes in the form and details of the method illustrated may be made by those skilled in the art without departing from the spirit of the invention. It is the intention therefore, to be limited only as indicated by the scope of the following claims.

What is claimed is:

1. Switching apparatus for accepting an analog signal from a signal source and providing an output signal which is equal and opposite in magnitude to said analog signal comprising: an amplifier circuit capable of amplifying and inverting signals applied to its input terminal and of providing said inverted signals at its output terminal; a first, and a second non-linear gate, each gate having a low impedance state during which signals are transmitted therethrough, and a high impedance state during which signal transmission therethrough is inhibited; a first, and a second resistor of equal value; circuit means for connecting said first resistor and said first gate in a series circuit having one end connected to said output terminal and the other end connected to said input terminal; circuit means for connecting said second resistor and said second gate in a series circuit having one end connected to said signal source and the other end connected to said input terminal; means for simultaneously rendering said gates in said low impedance state, whereby signals transmitted through said first gate to said input terminal tend to cancel signals transmitted through said second gate to said input terminal, the resultant signal at said input terminal driving said amplifier.

2. Switching apparatus as claimed in claim 1 further characterized by the addition of a capacitor connected to said input terminal, and means for simultaneously rendering said gates in said high impedance state whereby said capacitor maintains said resultant signal at said input terminal for a period of time.

3. Multiplexing apparatus for accepting analog signals from a plurality of signal sources and providing an output signal which is equal and opposite in magnitude to the analog signal from a selected one of said signal sources comprising: an amplifier circuit capable of amplifying and inverting signals applied to its input terminal and of providing said inverted signal at its output terminal; a plurality of non-linear gates, each gate having a low impedance state during which signals are transmitted therethrough, and a high impedance state during which signal transmission therethrough is inhibited; a first, and a second resistor of equal value; circuit means for connecting said first resistor and one of said gates in a series circuit having one end connected to said output terminal and the other end connected to said input terminal; circuit means connecting one end of said second resistor to said input terminal; circuit means connecting each of the remaining gates between one of said signal sources and the unconnected end of said second resistor; means for simultaneously rendering one of said gates connected to said signal sources and said gate connected to said output terminal in said low impedance state whereby signals transmitted through said gates in the low impedance state tend to cancel each other at said input terminal, the signal resulting from said cancellation at said input terminal driving said amplifier.

4. Multiplexing apparatus as claimed in claim 3 further characterized by the addition of a capacitor connected to said input terminal, and means for simultaneously rendering said gates in said high impedance state whereby said capacitor maintains said resultant signal at said input terminal for a period of time.

References Cited in the file of this patent

UNITED STATES PATENTS

| | | |
|---|---|---|
| 2,757,283 | Ingerson | July 31, 1956 |
| 2,782,307 | Von Sivers et al. | Feb. 19, 1957 |
| 2,803,703 | Sherwin | Aug. 20, 1957 |
| 2,831,985 | Eckert | Apr. 22, 1958 |
| 2,846,522 | Brown | Aug. 5, 1958 |
| 2,851,520 | Polonsky | Sept. 9, 1958 |
| 2,880,329 | Rector | Mar. 31, 1959 |

OTHER REFERENCES

"Waveforms," by B. Chance et al., McGraw-Hill Book Company, 1949, 1st edition, pp. 373–375.

The Review of Scientific Instruments, August 1955, pp. 745–747, by I. Cederbaum et al.